United States Patent [19]

Crask

[11] 4,280,121
[45] Jul. 21, 1981

[54] KEYBOARD ASSEMBLY WITH CONTROLLABLE KEY LEGENDS

[76] Inventor: Geoffrey J. Crask, 3010 S. Pacific Ave., Santa Ana, Calif. 92704

[21] Appl. No.: 912,260

[22] Filed: Jun. 5, 1978

[51] Int. Cl.³ .......................... G06F 3/02; G06G 3/00
[52] U.S. Cl. ...................... 340/365 VL; 200/DIG. 1; 340/365 C; 340/712; 364/706
[58] Field of Search .......... 340/365 R, 365 A, 365 C, 340/365 E, 365 S, 365 P, 365 L, 711, 705, 712, 365 VL; 364/706, 900 MS File, 200 MS File; 400/479.1; 235/145; 178/17 C; 179/90 K; 200/DIG. 1, 5 A

[56] References Cited

U.S. PATENT DOCUMENTS

| 3,879,722 | 4/1975 | Knowlton ...................... 340/365 R |
| 3,956,745 | 5/1976 | Ellis .............................. 340/365 R |
| 4,035,795 | 7/1977 | Fosnough et al. ............. 340/365 C |
| 4,037,092 | 7/1977 | Osborne ........................ 364/706 |
| 4,078,257 | 3/1978 | Bagley .......................... 340/365 R |
| 4,107,784 | 8/1978 | Van Bemmelen ............. 364/900 |
| 4,125,783 | 11/1978 | Sefton .......................... 340/365 C |

OTHER PUBLICATIONS

"Variable-Read Keyboard", Gelb et al., *IBM Technical Disclosure Bulletin*, vol. 15, May 1973, p. 3597.
"Variable Keyboard for Terminal Displays", Cummings, *IBM Technical Disclosure Bulletin*, vol. 16, Jul. 1973, pp. 575, 576.
"Programmable Key/Display/Switch Device", Bigbie et al., *IBM Technical Disclosure Bulletin*, vol. 21, Jul. 1978, pp. 442–444.

*Primary Examiner*—James J. Groody
*Attorney, Agent, or Firm*—William W. Haefliger

[57] ABSTRACT

A keyboard/display assembly is provided in which the individual key legends are controlled by an external computer. The computer is programmed to respond to any specific key activation in a manner defined by the current displayed legend for that key. These responses may include changing the legend on the initiating key, or those on any other keys. By this means, a small number of keys may replace an arbitrarily large number of fixed function keys.

7 Claims, 3 Drawing Figures

KEYBOARD ASSEMBLY WITH CONTROLLABLE KEY LEGENDS

BACKGROUND OF THE INVENTION

This invention relates generally to keyboard activated display of data, and more particularly concerns the provision of improvements in computer and operator controlled selection and display of data.

Manually operated remote controls for a wide variety of systems and devices have generally been implemented by groups of pushbutton or key switches, each having a fixed engraved or printed legend which defines the single function activated by that switch. Complex control panels containing many hundreds of pushbuttons are frequently needed to provide operator access to all available functions of the remote devices.

With the increasing application of computers and microprocessors to the direction and control of remotely operating devices, and the relatively high cost of, and space required by, many pushbuttons, a more efficient approach to manual control input facilities is desirable.

DESCRIPTION OF THE PRIOR ART

U.S. Pat. No. 3,187,321 to Kameny discloses a computer input device having a keyboard utilizing perforated cards which are installed on the keyboard as "overlays". In addition to providing legends to label the switches or keys of the console, the overlays include means for mechanically actuating various switches to generate code signals utilized by the computer to sense which overlay is in use.

U.S. Pat. No. 3,158,317 to Alexander relates to a similar apparatus in which physically projecting portions on the overlay mechanically actuate switches to cause the computer to initiate various operations relative to the subject matter of each overlay.

U.S. Pat. No. 3,394,368 to Carr describes a control keyboard containing magazines of several legend-bearing plates which, like the overlays of Kameny and Alexander, label certain switches on the keyboard while at the same time providing mechanical actuation of a series of switches which produce an electrical indication of which magazine is in use.

U.S. Pat. No. 3,956,745 to Ellis describes a programmable keyboard wherein the legends of sets of keys are stored in Read-Only memory devices at the keyboard and selectable by the operator.

U.S. Pat. No. 4,030,094 to Anderson substitutes lamp and photocell combinations for sensing which of a set of function overlays is in use, but is otherwise similar to the mechanical means cited above.

U.S. Pat. No. 4,066,850 to Heys describes a low cost waterproof keyboard assembly in which the number of keys available to the operator, and their legends, can readily be modified, but in a semi-permanent manner.

The above prior art illustrates the use of various devices at small keyboards or switch panels to permit the operator to select one of a set of predetermined arrays of key functions, and automatically to inform an associated computer which of the sets is in use. By these means, each key may be assigned several functions, thus permitting a corresponding reduction in the number of keys. In practice, this prior art severely limits the achievable variety of functions for each key, since all legends for the entire keyboard are selected simultaneously by each preprinted overlay device. Additional prior art avoids this limitation by mounting transparent switch devices over the face of a video display cathode ray tube and using the latter to create dynamic display legends. This approach to providing multiple key functions has inherent limitations in terms of complexity, size, weight, reliability and costs.

SUMMARY OF THE INVENTION

It is a principal object of the present invention to provide a simple, reliable, and economic means to label, in human language, each of the switches in a keyboard independently of the others so that each label may be readily changed.

A further object of the present invention is to relate, in the external label control mechanism, the label displayed at each key with the function to be performed when that key is activated by the operator. By this means, the signal transmitted by an active key may be predetermined and independent of the specific legend displayed.

A further object of this invention is to arrange manually operated keys with associated legend display devices so that the assembly may be readily coupled to any external control computer using standard communication methods, thus permitting a common assembly construction to be applied to an unlimited variety of functional tasks.

A further object of the present invention is to arrange manually operated keys with associated legend display devices so that the assembly may be relatively small, lightweight, and suitable for use in industrial environments.

Basically, the invention is embodied in a keyboard display assembly that includes:

(a) a transparent overlay incorporating an array of transparent switches thereon, and (b) an array of alphanumeric character displays at one side of the overlay and which have spatial correspondence to the switches on the switch array, the character displays adapted to be viewed through the overlay.

As will be seen, the switches may be defined by transparent conductive areas defining apparatus on an overlay panel; the character displays may comprise LED's or the like; data storage may be provided for the displays; and switch encoding may be provided, as will be described.

These and other objects, features and advantages of the present invention will become apparent from the following description of a preferred embodiment of the invention.

DRAWING DESCRIPTION

DETAILED DESCRIPTION

Figure 1:
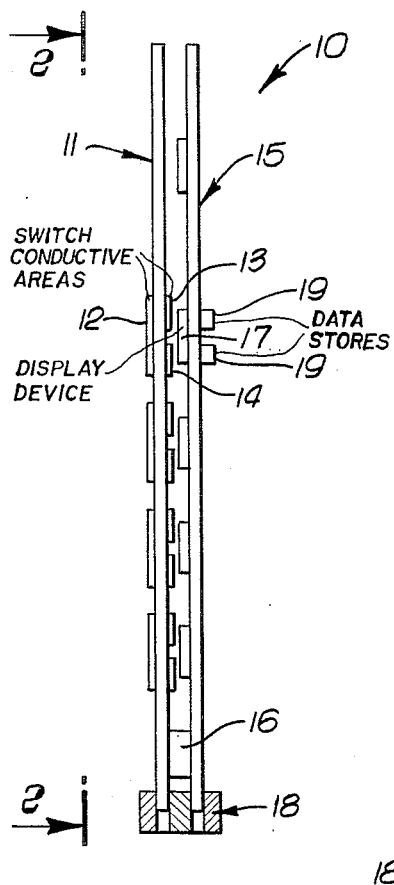
FIG. 1 is a side elevation illustrating one form of the invention.

In FIG. 1, the illustrated apparatus 10 which is a cross-section of one version of the invention, includes a transparent overlay sheet 11 made, for example, of impact resistant glass, and on the front and rear surfaces of which are deposited transparent electrically conductive areas, 12, 13 and 14, which form adjacent pairs of capacitors. Each pair of capacitors is used as the sensing element of a touch-sensitive switch mechanism, connected with suitable solid-state devices mounted on a printed circuit card, 15. The pairs of capacitors are repeated to form a group of, for example, twenty switches arranged in four rows of five columns. The necessary electrical connections between the capacitor plates on the rear of the glass and the circuit card are provided via flexible connections 16 at the edges of the glass sheet and card.

Figure 2:
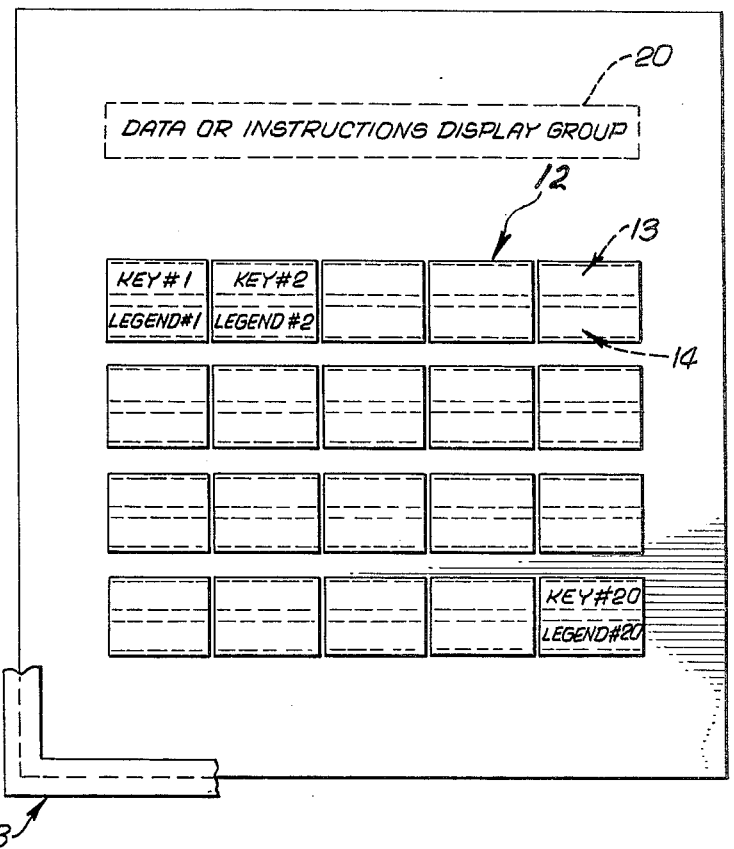
FIG. 2 is a front elevation taken on lines 2—2 of FIG. 1.
Figure 3:
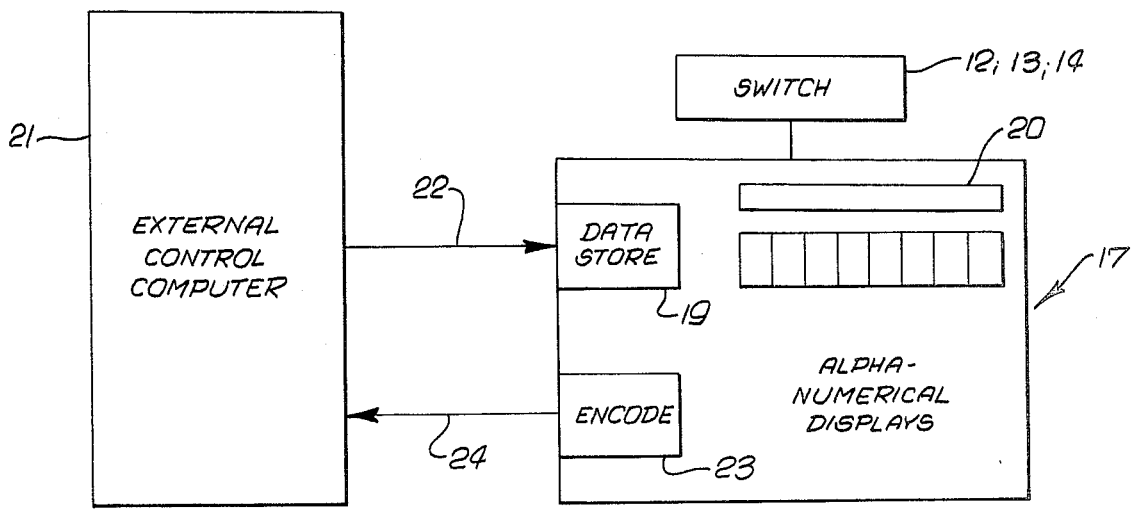
FIG. 3 is a block diagram illustrating the operation of the device.

In addition to the switch support devices, the printed circuit card 15 also mounts multiple light-emitting-diode alphanumeric character display devices, 17, typically arranged in rows aligned with the key areas, so that each key location is associated visually with, for example devices 17 having eight display characters. Each individual character position in the display is equipped with data storage, indicated by devices 19, so that the displayed character, once loaded, remains visible through the transparent overlay until subsequently overwritten by new data. FIG. 2 shows a plan view as seen by the operator of the typical assembly. FIG. 3 shows, in block diagram form, the invention and its interconnections with an external control computer.

As indicated in FIGS. 1 and 2, the apparatus includes a thin rectangular assembly comprising a sheet 11 of glass associated with a printed circuit card 15 of similar dimensions which are fixed in close proximity by a suitable mounting framework 18. Additional supporting solid-state devices 17 mounted on the circuit card provide facilities 23 for encoding an activated switch as a function of its position in the array and transmitting this code at 24 to an external control computer 21 using a convenient standard protocol, for example, ASCII code. Similarly, the external control computer, via a similar standard communication link 22 can transmit to the display character storage devices arbitrary alphanumeric legend data for all key positions in the array, overwriting previously stored data at devices 17.

As also indicated in FIG. 2, the preferred embodiment of the invention includes a separate group 20, of alphanumeric character displays which can be selected and used by the external control computer either to prompt the operator or to present other related system data.

Typical operation of the device includes operator selection and touching of a switch (corresponding to a selected legend) to signal the computer to take some action depending on the present value of that legend; and operation of a switch in the same manner to cause the computer to index or change the legend associated with itself or another switch, in addition to some other external action.

Examples of commercially available elements referred to above are listed as follows:

| ITEM | MANFACTURER AND PART NUMBER |
|------|------------------------------|
| 17   | LITRONIX, DL2416             |
| 19   | PART OF ITEM 17              |
| 20   | AMERICAN MICROSYSTEMS INC., S 9263 |
| 21   | ANY DIGITAL COMPUTER OR MICROPROCESSOR |

Item 19 in FIG. 3 may also be considered to include circuitry for decoding data received from computer 21, and routing it to specific display data storage locations.

From what has been described, the invention provides:

(a) an operator interface assembly comprising an array of transparent switches covering a corresponding array of self-luminous alphanumeric character displays;

(b) the assembly of (a) equipped with bidirectional communication means by which an external control computer may transmit arbitrary legends to each key position and sense activation by the operator of any key;

(c) the assembly of (a) and/or (b) extended by means of additional display characters not related to key positions to permit the associated control computer to issue instructions to, or display other related system data for, the operator, these instructions or data also being presented in plain language rather than special codes;

(d) the assembly of (a) and (c) implemented using self-luminous alphanumeric character display devices such that the keyboard/display assembly may be constructed in a thin planar format, with resulting advantages in respect of size, weight, and immunity to vibration.

The invention has been described, for clarity, in relation to a specific preferred embodiment. It will, however, be understood that others skilled in the art can develop many differing versions of this device which fall within the scope of the invention, as defined by the following claims:

I claim:

1. In an interactive keyboard and display assembly, the combination of
    (a) a mounting structure comprising a first rigid sheet of transparent, insulative material, the sheet having front and rear sides,
    (b) a planar array of transparent switches on said sheet, each switch comprising first, second and third parallel, electrically conductive and transparent layers, the first layer located at the front side of the sheet, the second and third layers located at the rear side of the sheet and being everywhere separated from the first layer by the material of the first sheet, the first layer overlapping the second and third layers, there being space between said second and third layers, said three layers defining an adjacent pair of capacitors forming a touch sensitive switch,
    (c) rigid sheet means extending at the rear side of the first sheet,
    (d) alphanumeric display devices carried by the rigid means in relatively closely spaced opposed relation to said respective switches, and characterized in that each device is in registration with multiple of said layers of a single switch and also in registration with and closely adjacent said space between the second and third layers, whereby said devices are visible through said switch layers, said space and the first sheet, and
    (e) multiple data storage devices, at least one for each display device, mounted on said rigid sheet means.

2. The combination of claim 1 wherein said second and third transparent conductive layers are spaced apart, but co-planar, and said alphanumeric display device extends opposite portions of both said second and third layers.

3. The combination of claim 1 wherein the switches in the array are arranged in rows and columns.

4. The combination of claim 1 wherein said display devices are defined by light emitting diodes.

5. The combination of claim 1 wherein said data storage devices are located proximate the respective alphanumeric display devices for maintaining alphanumeric character display visibility through the switches.

6. The combination of claim 1 wherein said display devices are mounted on a single card defined by said rigid sheet means, said card located in close physical proximity to the switches, there being mounting means for said first sheet and said card.

7. The combination of claim 6 wherein said card also mounts said data storage devices.

* * * * *